US008827027B2

(12) United States Patent
Syvret et al.

(10) Patent No.: US 8,827,027 B2
(45) Date of Patent: Sep. 9, 2014

(54) WINDOW SYSTEMS FOR VEHICLES

(75) Inventors: Andrew John Syvret, Warwick (GB); Adrian Charles Morgan Jenkins, Warwick (GB); William Manuel Walsh, Warwick (GB)

(73) Assignee: Aston Martin Lagonda Ltd., Gaydon (GB)

( * ) Notice: Subject to any disclaimer, the term of this patent is extended or adjusted under 35 U.S.C. 154(b) by 0 days.

(21) Appl. No.: 13/391,776

(22) PCT Filed: Aug. 26, 2010

(86) PCT No.: PCT/GB2010/001616
§ 371 (c)(1),
(2), (4) Date: Jun. 6, 2012

(87) PCT Pub. No.: WO2011/023955
PCT Pub. Date: Mar. 3, 2011

(65) Prior Publication Data

US 2012/0234621 A1 Sep. 20, 2012

(30) Foreign Application Priority Data

Aug. 26, 2009 (GB) .................................. 0914921.2

(51) Int. Cl.
*B60J 1/12* (2006.01)
*E05F 15/16* (2006.01)
*E05F 15/20* (2006.01)

(52) U.S. Cl.
CPC ............ *E05F 15/20* (2013.01); *E05Y 2400/52* (2013.01); *E05Y 2400/356* (2013.01); *E05Y 2900/508* (2013.01); *E05F 15/1684* (2013.01); *E05Y 2800/00* (2013.01); *E05Y 2900/55* (2013.01); *E05Y 2800/254* (2013.01); *E05Y 2400/358* (2013.01)
USPC ................ 180/281; 701/49; 49/141; 49/349; 49/502; 180/271; 180/289

(58) Field of Classification Search
USPC ................ 701/45, 49; 49/141, 348, 349, 502; 296/146.2; 180/271, 274, 281, 286, 180/289
See application file for complete search history.

(56) References Cited

U.S. PATENT DOCUMENTS 4,571,884 A * 2/1986 Hetmann et al. .................. 49/72
5,248,897 A * 9/1993 Lee ............................. 307/10.1

(Continued)

FOREIGN PATENT DOCUMENTS

DE 3512117 10/1986
DE 102007031409 1/2009

(Continued)

OTHER PUBLICATIONS

International Search Report and Written Opinion dated Feb. 7, 2011, PCT/GB2010/001616, 19 pages.

(Continued)

*Primary Examiner* — Ruth Ilan
(74) *Attorney, Agent, or Firm* — Dorsey & Whitney LLP

(57) ABSTRACT

A motor car (10) has windows (28, 49) which can have a first $H_1$ fully closed position and a lower $H_2$ position in which water tightness is still provided but opening of a frameless window assembly/door assembly can be achieved more quickly from the point in time in which the door handle 44, 46) is operated. The Hi position may be selected as the vehicle accelerates above a given speed and the $H_2$ position may be selected when the vehicle door is closed, and the window may also have a short-drop $H_3$ lower re-spool $H_4$ position or in the case of a rear window a three quarter lowered $H_5$ position.

32 Claims, 9 Drawing Sheets

(56) References Cited

U.S. PATENT DOCUMENTS

| | | | | |
|---|---|---|---|---|
| 5,574,315 | A * | 11/1996 | Weber | 307/10.1 |
| 5,975,231 | A * | 11/1999 | Hirato | 180/274 |
| 6,364,397 | B1 | 4/2002 | Bordeaux et al. | |
| 6,748,308 | B2 * | 6/2004 | Losey | 701/49 |
| 7,246,676 | B2 * | 7/2007 | Cantu | 180/268 |
| 7,362,068 | B2 * | 4/2008 | Yamamoto | 318/469 |
| 7,424,353 | B2 * | 9/2008 | Engelhardt et al. | 701/45 |
| 7,861,460 | B1 * | 1/2011 | Costello et al. | 49/141 |
| 8,291,645 | B2 * | 10/2012 | Hohn et al. | 49/506 |
| 2002/0108310 | A1 | 8/2002 | Schröer | |
| 2002/0152013 | A1 * | 10/2002 | Knab et al. | 701/49 |
| 2003/0071446 | A1 * | 4/2003 | Haderer et al. | 280/735 |
| 2004/0095084 | A1 | 5/2004 | Mersch | |
| 2006/0293821 | A1 * | 12/2006 | Takahashi | 701/49 |
| 2009/0058340 | A1 * | 3/2009 | Sakai et al. | 318/434 |
| 2010/0332086 | A1 * | 12/2010 | Zhao | 701/49 |
| 2012/0136532 | A1 * | 5/2012 | Konchan | 701/36 |
| 2013/0055642 | A1 * | 3/2013 | Patterson | 49/349 |

FOREIGN PATENT DOCUMENTS

| | | |
|---|---|---|
| EP | 1232886 | 8/2002 |
| GB | 2133461 | 7/1984 |
| JP | 9169212 | 12/1995 |

OTHER PUBLICATIONS

Search Report dated Dec. 8, 2009, GB 0914921.2, 4 pages.

* cited by examiner

WINDOW SYSTEMS FOR VEHICLES

This application is the national stage application of PCT Patent Application No. PCT/GB2010/001616 filed Aug. 26, 2010, and entitled, "Window Systems for Vehicles," which claims priority to United Kingdom Application No. GB 0914921.2 filed Aug. 26, 2009, both of which are hereby incorporated by reference herein in their entireties

FIELD

The present invention relates to window systems for vehicles, window control systems and vehicle window seals.

BACKGROUND

It is known to prove a motor car with frameless windows on the driver and passenger doors in which there is no frame member engaging along a top edge of these windows when the associated door is open. When the door is open, the window can be raised to a position which is slightly below the fully closed position. Then, when the door is shut, the window is raised to a fully closed position in which it seals into a seal extending along the bodywork of the vehicle above the window. Later, when the door handle is operated to open the door, the window is lowered out of the seal to enable the door to be opened without interference between the seal and window during this process. This arrangement can allow fairly good sealing, but the window can only move at a finite speed and there is a delay in time between when the door handle is operated and when the door can actually be opened. Furthermore, in some cases of total vehicle power failure or when emergency vehicle evacuation is desirable it may not always be particularly easy to open the vehicle doors.

SUMMARY

The present invention aims to alleviate at least to a certain extent problems of the prior art, to improve upon the prior art at least to a certain extent or generally to provide useful systems.

According to a first aspect of the present invention there is provided a window system for a vehicle, the system comprising an openable window and a controller for controlling positions of the window, the controller being arranged for controlling the window to a first closed position when a first condition occurs and to a second closed position when a second condition occurs. This has been found to be highly advantageous since it is possible to provide a first closed position in which the window is firmly closed and is highly watertight and wind tight for minimising drafts and noise, and a second closed position may be provided in which the window is just closed thereby enabling a door to which the window is attached to be opened quickly, or at least without undesirably noticeable grabbing of the window on a seal thereof, due to a small amount of window movement being necessary before the door can open while at the same time being sufficiently prepared and watertight against the elements such as rain or smoke when the vehicle is parked.

According to a further aspect of the invention there is provided a window control system for a vehicle having an openable window, the control system comprising a controller for controlling positions of the window, the controller being arranged for controlling the window to a first closed position when a first condition occurs and to a second closed position when a second condition occurs.

In an embodiment, the window is slideable in a vehicle door and has a top edge arranged to seal with a window seal, the window having a greater insertion into the seal in the first closed position than in the second closed position. The window seal may extend longitudinally along the top edge and may be fixed to bodywork of the vehicle above the window, such as a cant rail.

The seal may have an outer portion extending therealong and the top edge may be inserted about 5 mm into the seal past the outer portion when the window is in the second position. The seal may be generally U-shaped and inverted and may be in at least two or three separate parts for sealing on top of the window with the outer portion engaged against an outer face of the window in the region of the top edge.

The window may be generally planar or slightly curved, such as convex when viewed from the outside.

The seal may have an outer portion extending therealong and the top edge may be inserted about 9 mm into the seal past the outer portion when the window is in the first position.

The insertion amounts in the first and second positions may be tuneable. An insertion of 5 mm+ or −2 mm or 5 mm+ or −1 mm or + or −½ mm in the second position has been found to provide good sealing against the elements while also allowing the top edge of the window to be retracted past the window seal to enable the door to be opened relatively soon after actuating a door handle associated with the door and with no undesirable window grabbing by the seal. An insertion level of 9 mm+ or −3 mm, or 9 mm+ or −2 mm or 9 mm+ or −1 mm when the window is in the first position has been found to enable a very affective seal to be achieved without drafts and with minimum wind noise ensured when the vehicle is being used.

The controller may be arranged to move the window to the first closed position in response to vehicle motion. Accordingly, when the vehicle is parked, the window may be in the second closed position and then when the vehicle begins to move or exceeds a certain speed the window may be raised or otherwise move to the first closed position. A vehicle speed sensor may be provided in which case the controller may be arranged to move the vehicle to the first position when the speed sensor detects speed exceeding a predetermined speed. This predetermined speed may be approximately 5 to 10 kilometers per hour and may be the same speed as a speed at which vehicle door locks are set locked.

The system may include a door handle sensor arranged to provide an indication upon door handle actuation and the controller, upon door handle actuation, may be arranged to control the window to a third position which is an open position in which the door may be opened. Accordingly, when the vehicle has been used and has been in motion and the window is in the first closed position, or when the vehicle has been parked and the window has been in the second position, actuation of the door handle may cause the door handle sensor to send a signal to the controller to enable the controller to control the window to the third, open position. In the third position, the window may be opened or dropped approximately to a position 18 mm below the second closed position, or this may be thought of as a position 13 mm opened or dropped below the vehicle cant rail or the bottom edge of a seal attached to the vehicle for sealing against an outside surface of the window. This therefore allows the door to be easily and quickly opened or slammed shut without causing sudden undesirable pressure changes which may otherwise be felt to be uncomfortable on the ears of occupants in the vehicle. This drop position may be at 13 mm+ or −5 mm below the vehicle cant rail, a seal or bodywork which would block door opening by interfering with the window (which may also be called the nominal cant rail position), more preferably 13 mm+ or −2 mm or 13 mm+ or −1 mm.

In an embodiment, the controller is arranged to control the window to the third position via a fourth position in which the window is further opened than in the third position. In the fourth position, the window may be approximately 5 mm below its position in the third position. This spooling method, which involves opening or dropping to the third position via the fourth position is advantageous in that it enables backlash to be eliminated or corrected and relaxation (e.g. of cables) to be corrected in a window regulator assembly which may be present to move the window glass in response to instructions issued by the controller.

The window system may in an embodiment include a door latch sensor (or door closed sensor) and the controller may be arranged to control the window to the second position in response to a signal that door latching or closing has just occurred. Accordingly, the window may advantageously be left in the second closed position when the vehicle is parked.

The controller may be arranged to receive a signal from a speed sensor and may be arranged to disable all window movement operations when the speed sensors detects a speed higher than a set amount. The set amount may be an amount greater than 150 kilometers an hour, such as approximately 225 to 240 kilometers an hour (140 to 150 mph). This functionality advantageously may therefore prevent window operation at high speed which may otherwise overload components in the window assembly or stalling of a window regulator for moving the window due to aerodynamic forces at very high speed and may also advantageously prevent accidental distraction of the driver while the vehicle is travelling very fast. This may be particularly applicable in sports, GT, saloon and convertible motor cars which are capable of driving at very high speeds.

The window system may include a crash sensor and the controller may be arranged to control the window to be lowered from the first closed position (or from any position higher than the second position) in response to a crash signal issued by the crash sensor. In this case, the controller may control the window to be lowered to the second position which may enable rescue personnel to evacuate occupants from the vehicle to which the system is fitted relatively easily and may also assist the occupants to evacuate the vehicle. It may also be advantageous in cases where a seal is still desirable after crashing, which may for example be the case in the eventuality of certain types of crashes into water or other hostile environments. This functionality makes opening of the door glass and/or the associated door easier.

In some preferred embodiments the system includes a window regulator having a motor for moving the window, the regulator being arranged for operation in response to the controller. The regulator may be of relatively standard type having a rail and cable system for sliding or pivoting the window between positions. The regulator may include a window position sensor or may be arranged to estimate accurately window position based upon stall thereof at known window top stop or bottom stop positions and known movements of a motor of the regulator subsequent to stall in a known said position The regulator may be separate to the controller. The controller may be an individual component such as an ECU or small programmable computer. Alternatively, for example in the case of the regulator for a vehicle driver door, the controller may be positioned at or integral with the regulator so as to be near to various window command switches which may be fitted in this door for controlling all of the windows of the vehicle.

In another aspect, the invention resides in a vehicle including a system as set out in any of the previous aspects of the invention. The vehicle may be a motor car. Examples are motor cars having frameless windows, sports, saloon, GT and convertible motorcars. However, the invention is applicable in other types of vehicle including buses, trucks and lorries.

The vehicle may include a first vehicle side which has a front window arranged for movement in a front door and a rear window arranged for movement in a rear door. The vehicle may also include a second similar vehicle side.

Each door may have an operation handle associated therewith for opening the same, or two said operation handles, in which case one said handle may be located on an interior side of the door and another operation handle may be located on an exterior side of the door. The controller may be arranged to control both windows to the third position upon operation of either operation handle, particularly when a said window is above the third position. This may be particularly advantageous in vehicles having no B-pillar in which the front and rear windows closely abut together with one another separated only by a mutual seal. The controller may be arranged to control the rear window to the second position upon receipt of a signal that the rear door is latched closed (this in some embodiments only happens if the rear window is at or above the third position) and to control the front window to move to the second position only after the rear window has reached the second position (this is some embodiments only happens if the front window is at or above the third position). This sequencing can be advantageous, especially in motor vehicles with no pillar such as a B-pillar between the front and rear windows since it enables one window (e.g. the rear) to help create a frame for the other window, which may be less well supported.

The rear window may have a range of movement from fully open to fully closed and the controller may be arranged to open the rear window to a position in which it is at least 50%, preferably about 75%, towards the fully open position upon operation of a door handle associated with the rear door. This is advantageous since it allows convenient passenger access in and out of the rear door without interference from the window and may be particularly beneficial in cases in which the rear window is concave and/or leans inwardly towards its upper edge.

The controller may be arranged to control the front and rear windows to the second closed position in response to a vehicle global close signal. The global close signal may be received wirelessly from a key fob held by an operator of vehicle. Alternatively, the global close signal may be provided in response to activation of a switch in the vehicle in which case this signal may also in some embodiments selectively actuate vehicle ventilation recirculation and/or pollen or fine filter functions and maybe useful if the driver notes the vehicle is about to enter smoke such as from bonfires. This advantageously improves security and allows quick sealing of the vehicle such as when entering adverse weather or smoke or when a security risk is noted.

The controller may be arranged to open the front and rear windows to fully open positions thereof in response to a vehicle global open signal which may be provided either wirelessly from a remote key fob or from a switch in the vehicle. This is advantageous in various situations, such as when it is desired to cool the vehicle quickly upon entry into it on a hot day or when it is simply desirable to fully open all of the windows with minimum effort and distraction of the driver.

The window may be part of a frameless window assembly, the window having a free upper edge which is arranged to seal against a seal secured to a body portion e.g. a fixed body portion of the vehicle.

According to a further aspect of the invention there is provided a method of controlling window positions in a vehicle which comprises moving a vehicle window to a first closed position when a first vehicle condition occurs and moving the vehicle window to a second closed position when a second vehicle condition occurs.

The method may include sliding a top edge of a window into a seal to close the window and the edge may be inserted further into the seal in response to the occurrence of the first condition than when the window is in the second closed position. The first condition may occur upon vehicle speed exceeding a predetermined value. The second condition may occur upon closing a vehicle door to which the window is mounted.

According to a further aspect of the invention there is provided a window seal for sealing against an edge portion of a moveable vehicle window, the seal having a first resilient portion arranged to seal against an external side of a window, a second resilient portion arranged to seal against an interior side of a window and a third resilient portion arranged to seal against an edge face of the edge portion of the window. This structure advantageously allows sealing of the window in at least three places. In a first configuration, the window glass may seal against the first and second portions. The window may be further insertable into the seal such that a top edge of the window seals against the third portion, thereby achieving a very effective seal. The first portion may have a generally straight finger-shaped cross-section which in an undeformed configuration is generally perpendicular to a general plane of the window. The second portion in an undeformed configuration thereof may have a generally hollow U-shaped cross-section extending generally slanted at about 45° to a general plane of the window. The third portion may be generally L-shaped in cross-section in an undeformed configuration thereof, a distal end of the L-shaped third portion pointing towards the exterior of the window.

According to a further aspect of the invention there is provided a window control system for movable vehicle window which is arranged to control the window away from a fully closed position in response to a signal from a vehicle crash sensor.

BRIEF DESCRIPTION OF THE DRAWINGS

The present invention may be carried out in various ways and a preferred embodiment of a window system for a vehicle in accordance with the invention will now be described by way of example only with reference to the accompanying drawings, in which:

FIG. 16 shows a seal extending between edges of front and rear windows of the motor car.

DETAILED DESCRIPTION

Figure 1:
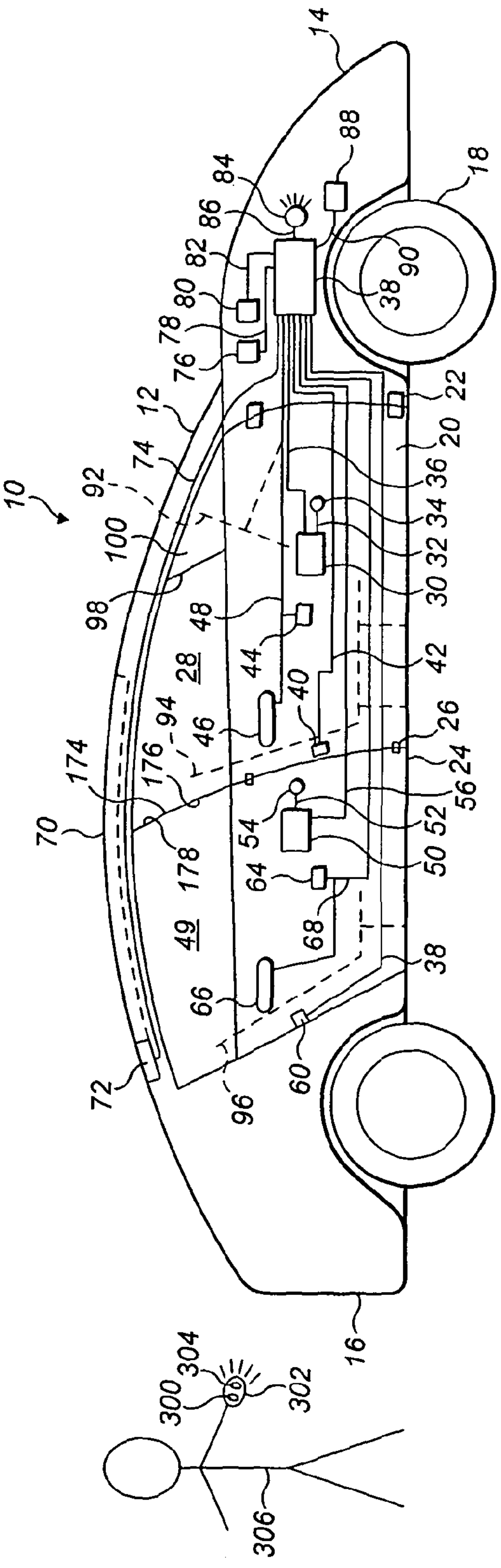
FIG. 1 shows a preferred embodiment of a window system and control system in accordance with the invention applied in a motor car.

FIG. 1 shows schematically a side view of a preferred embodiment of a vehicle in the form of a motor car 10 having a body 12 with a front end 14 and a rear end 16 with wheels 18. The motor car 10 is powered in a conventional manner by a motor or engine (not shown).

Each side of the motor car 10 includes a front door 20 openable pivotally around a hinge system 22 and a rear door 24 open pivotally about a hinge system 26, the hinge systems, 24, 26 being located at respective front edges of the doors 20, 24.

The front door 20 has a window glass 28 driven by a regulator/motor 30 which is connected by a signal path 32 to a user-operable window switch 34 and by a signal path 36 to a controller 38 in the form of an ECU or electronic programmable computer. The front door 20 also includes a door latch sensor 40 connected by a signal path 42 to the controller 38 and interior 44 and exterior 46 door lever/actuator sensors connected by signal path 48 to the controller 38.

In a similar way, the rear door 24 has a window glass 49 driven up and down by a regulator/motor 50 which is connected by a signal path 52 to a user operable window switch 54 and which is connected to the controller 38 by a signal path 56. The rear door 24 also has a door latch sensor 60 connected by a signal path 62 to the controller 38 and user operable interior 64 and exterior 66 door lever/actuator sensors which are connected by a signal path 68 to the controller 38. Sensors 40, 44, 46, 60, 64, 66 may be micro-switches. The rear door 24 may be fitted with a conventional child lock to inhibit opening of the door 24 using the interior door handle/lever.

A roof 70 includes a motorised sunblind 72 connected by a signal path 74 to the controller 38.

Additionally, the motor car 10 has a crash sensor 76 connected by a signal path 78 to the controller 38, a speed sensor 80 connected by a signal path 82 to the controller 38, a wireless receiver 84 connected by a signal path 86 to the controller 38 and a vehicle power mode sensor 88 connected by a signal path 90 to the controller 38.

The motor car 10 also includes various conventional components including a steering wheel 92, front seat 94 and rear seat 96.

The front window 28 is separated by a division bar 98 from a front quarter light window 100. In other embodiments the division bar 98 and front quarter window 100 may be replaced by a window sail.

Figure 4:
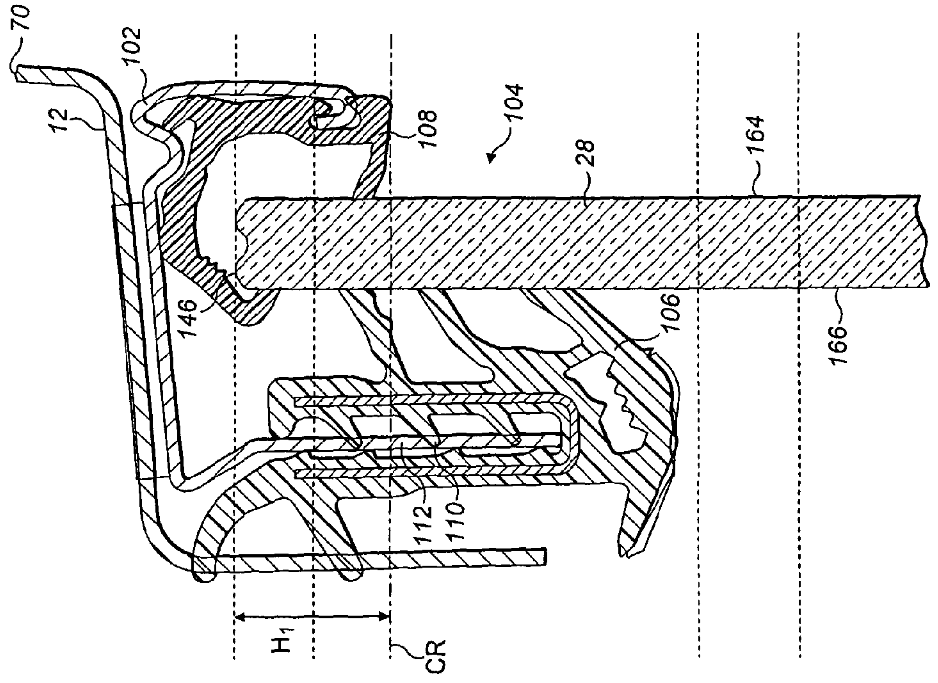
FIG. 4 is a section through a top edge portion of a window glass and seal with the window glass in a fully raised "$H_1$" position.
Figure 7:
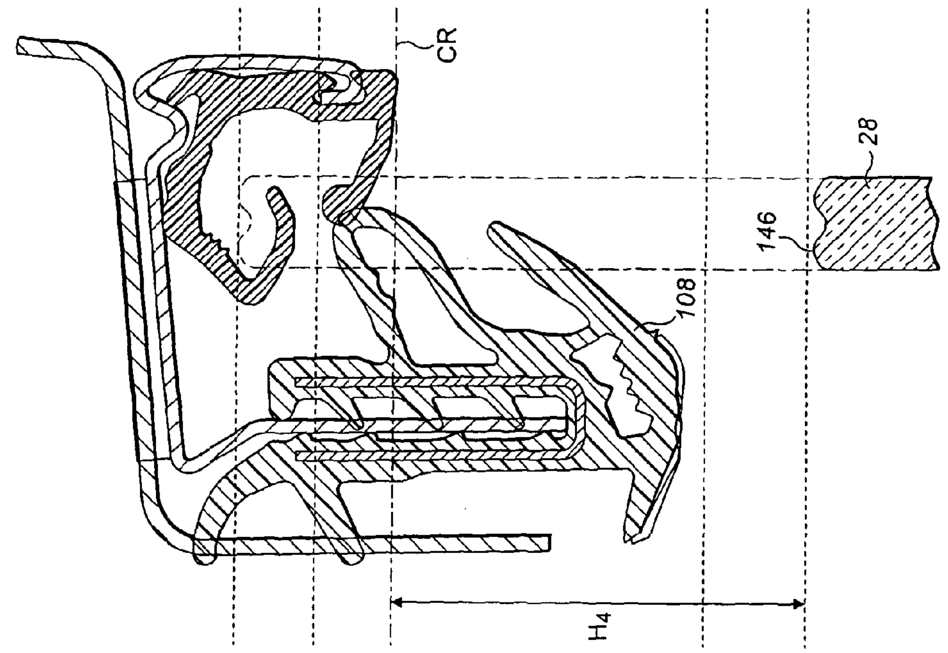
FIG. 7 is a view equivalent to FIG. 4 with the window glass shown in a further lowered "$H_4$" position.

With the windows 28, 49 in a fully raised position shown in FIG. 4, in the case of the vehicle shown which has no B-Pillar, a cant rail 102 with a seal 104 made up of inner 106 and outer 108 seal members fixed thereto extends all of the way along top edges of the quarter light window 100, front window 28 and rear window 49. FIGS. 4 to 7 show four positions of the front window 28 relative to the cant rail 102 and/or vehicle body 12 and/or roof 70, but the same positions apply in relation to the rear window 49. In FIGS. 4 to 7, the seal members 106, 108 are shown schematically in undeformed configurations thereof throughout. In practice, gripper strips 110 on the inner seal member 106 are deformed to be flush against a generally vertical inner member 112 of the cant rail 102 and the inner 106 and outer 108 seal members deform both when they touch each other as shown in FIGS. 6 and 7 and when they are touched by the window glass 28 in the positions shown in FIGS. 4 and 5. In the generally undeformed configuration shown in FIGS. 6 and 7, the inner seal member 106 has a first finger 114 extending upwardly at an angle at approximately 45° to a general plane of the window glass 28 and a hollow U-shaped element 116 having two limbs 118, 120 extending from a main body portion 122 of the seal 106 upwardly at an angle of approximately 45° to the general plane of the window 28. The limbs 118, 120 are joined at distal ends thereof by an integral curve 124. The main body portion of the seal element 106 also incorporates extending therealong a U-shaped element which surrounds the inner member 112 of the cant rail 102 and resiliently biases the gripper strips 110 onto the inner member 112. The cant rail 102 also includes therealong a generally horizontal top portion 128 which is secured to the bodywork 12 by an elongate adhesive/sealing strip 130 extending therealong.

At an outer side 132 of the top portion 128, the cant rail 102 is provided with a rain gutter channel 134. The cant rail 102 also has a generally vertically downwardly extending outer portion 136 which in cross section has a curved up lower end 138 forming a channel 140. The outer seal member 108 has a generally horizontal finger member 142 having a lower surface 144 whose position defines a (nominal) cant rail height marked by the line $C_R$ in FIG. 6. The finger 142 engages the curve 124 of the U-shaped element 116 when a top edge 146 of the window glass 28 is lower than the cant rail height $C_R$. The outer seal 108, in addition to the finger 142, includes an integral main body 148 fixed to the cant rail 102 by the engagement of fingers 150, 152 with a lower side of the gutter channel 134 and the channel 140, as well as an integral generally L-shaped top seal member 154 in the form of an L-shaped finger having an upper portion 154 which in an undeformed configuration thereof extends downwardly from where the finger is attached to the main body 148 at approximately an angle of 45° to a general plane of the glass 28 towards an interior direction D (see FIG. 6). The finger part 154, 156 is joined by a flexible knuckle part 158 to a slightly curved lower finger part 160 which extends generally horizontally and has a distal tip 162 pointing in a direction opposition the direction D towards an exterior side of the seal.

With the window glass 28 shown in the configuration of FIG. 4, the top edge 146 of the window glass 28 is a distance $H_1$ above the cant rail height $C_R$ which in this embodiment is 9 mm, but may be different in other embodiments and tuneable within or between embodiments. This position is referred to herein as the $H_1$ position and in this position, the window glass 28 has exterior 164 and interior 166 sides thereof sealingly engaged by the deformed finger 142 and the first finger 114 and U-shaped element 116 of the inner and outer seal members 106, 108. Additionally, the top edge 146 of the window glass 28 is sealingly engaged with the deformed finger part 160. This arrangement provides three separate sealing elements sealing against the window in this position, in fact with seal surfaces in at least four locations between the interior and exterior sides 166, 164 of the window glass 28, and enables a very good seal to be achieved which is sufficiently watertight and draft/wind-noise proof to provide excellent conditions in the motor car 10.

Figure 5:
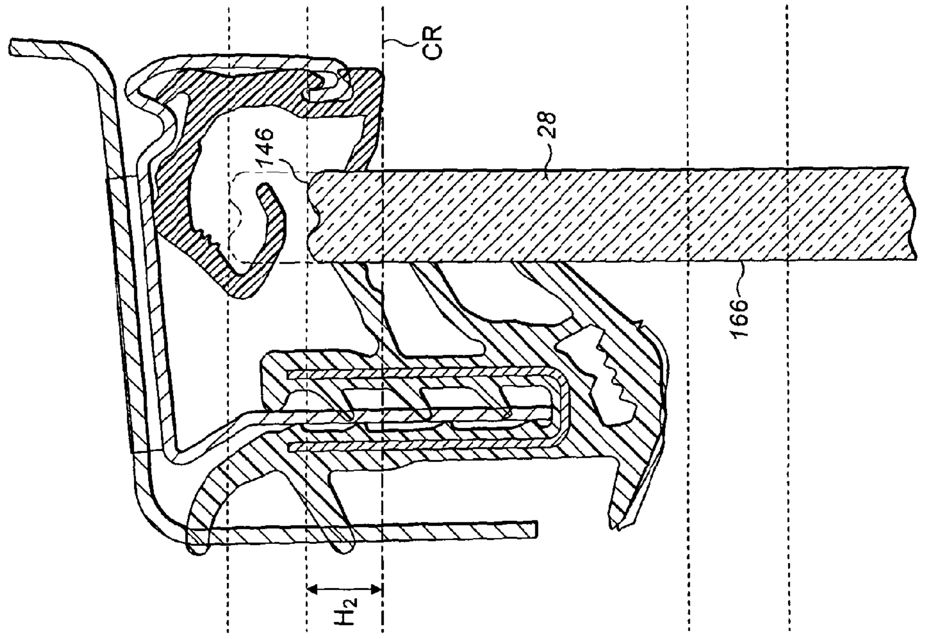
FIG. 5 is a view is a view equivalent to FIG. 4 but with the window glass in a slightly lower "$H_2$" position.
Figure 6:
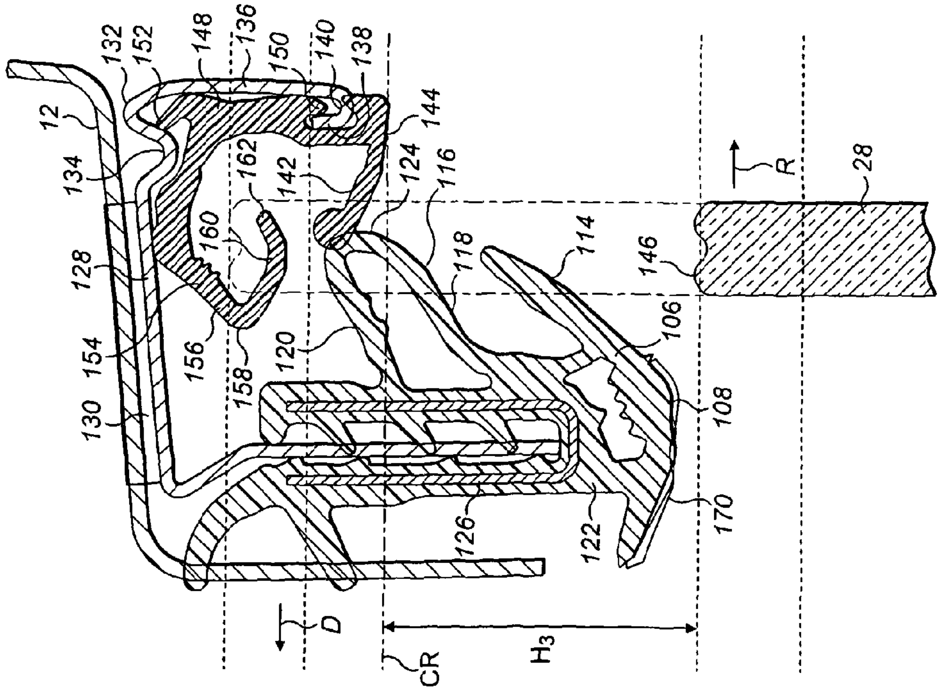
FIG. 6 is a view equivalent to FIG. 4 but showing the window glass in a lowered "$H_3$" position.

In the view of FIG. 5, the top edge 146 of the window glass 26 is a distance $H_2$ above the cant rail line $C_R$ which in this embodiment is approximately 5 mm. In this position, window glass 28 does not engage the top seal member 154 but it is engaged both by the exterior finger 142 and the hollowed U-shaped element 116 on the interior side 166 thereof, as well as the first finger 114. In this position, referred to herein as the $H_2$ position, the window glass 28 is lower than in the $H_1$ position, and the top edge 146 can more quickly be retracted below the cant rail line for enabling opening of the frameless window 28 and front door 20 quickly. Additionally, in the $H_2$ position, the window 28 is well sealed against the elements including rain water.

In the position shown in FIG. 6, the top edge 146 of the window glass 28 is dropped a distance $H_3$ below the cant rail height $C_R$ which is 13 mm. In this position, the top edge 146 of the glass 28 is not only below the lower surface 144 of the outer seal member 108, but it is also below a lower surface 168 of the inner seal member 106 and a trim member 170 thereon. This allows the window glass 28 and front door 20 to be opened by movement in the direction R in FIG. 6 to the right without interference between the top edge 146 of the window and the lower surface 144 of the outer seal. Additionally, there is an air gap 172 between the top edge 146 of the glass 28 and the inner seal member 146 and trim 170 which allows the passage of air therethrough such that in this $H_3$ position quick opening and slamming of the front door 20 and window 28 do not cause pressure changes which are uncomfortable for the ears of occupants of the motor car 10.

With the window glass 28 in the position shown in FIG. 7, the top edge 146 of the window is a distance $H_4$ below the cant rail height $C_R$ which is a greater distance than the $H_3$ distance and in this example $H_4$ is a distance of 18 mm.

It will be appreciated that in this embodiment both windows 28, 49 are driven by the respective regulators 30, 50 with generally vertical translational movement which may actually be vertical or somewhat off vertical and the distances $H_1$, $H_2$, $H_3$ and $H_4$ are considered to be distances moved during this generally translational movement. The various positions may be positions as seen by the regulator or as calculated by the controller in response to motor movements or other measured movements of the regulator. The $H_1$ position may be established by the regulator by moving or re-pulsing (or re-setting) the window to a top stop position of the regulator and the positions of the $H_2$, $H_3$ and $H_4$ or other positions may be set by counting movement from this point.

Figure 2B:
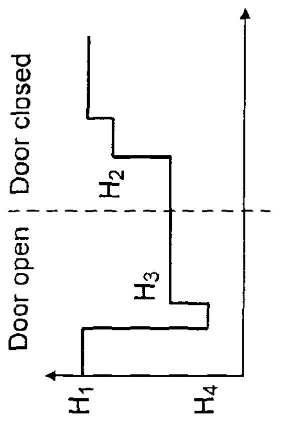
FIG. 2B is an example of window positions controlled by the control system plotted against time.
Figure 3B:
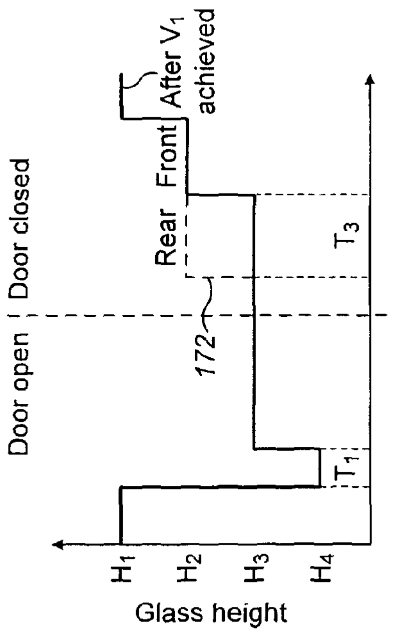
FIG. 3B is a view similar to FIG. 2B but showing a rear and front window closing sequence.
Figure 2A:
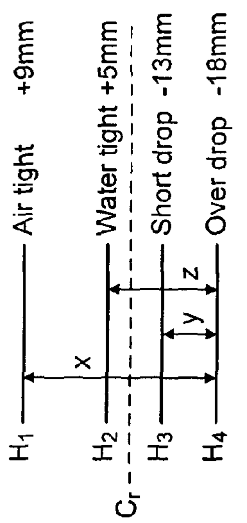
FIG. 2A shows various window positions in the window system.

With regard to the operation of the window system and control system, FIG. 2B shows that when the vehicle has been driven the window 28, 49 may be in the $H_1$ position. However, when the door 20 is then opened, the window(s) 28, 49 may drop a distance X (FIG. 2A) from the $H_1$ position to the $H_4$ position and then spool a distance Y up to the $H_3$ position in response to activation of either door handle switch/sensor 46, 44 causing the controller 38 to instruct the window regulator (s) 30, 50 to accomplish this movement. As indicated in FIG. 2B, once the door 20 is closed, the door latch sensor 40 send a signal along signal path 42 to the controller 38 which instructs the regulator 30 to raise the windows to the $H_2$ position. While in the $H_2$ position the door(s) 20, 24 can be fairly quickly opened again since the top edge 146 of the window only has to travel 5 mm down from the $H_2$ position, rather than 9 mm down from the $H_1$ position before the doors can move away from the top window seals 106,108. Once the vehicle is in motion again and exceeds a predetermined speed $V_1$ which may be the vehicle drive away door lock speed of approximately 5 to 10 kilometers an hour, the speed sensor 80 sends a signal along the signal path 82 to the controller 38 which then instructs the regulators 30, 50 to raise the windows 28, 49 back to the $H_1$ position. FIG. 3B shows a similar chart of window heights to that in FIG. 2 although as seen in FIG. 3B by the dashed line 172 in this method, once the door is closed the rear window 49 is first raised from the $H_3$ position to the $H_2$ position and, once this has been accomplished, after a time delay of $T_2$ the front window is then raised from the $H_3$ position to the $H_2$ position. This sequences is advantageous in some embodiments such as that shown in FIG. 1 where the motor car 10 has no B-pillar and only has a seal 174 providing for sliding movement between the window glasses 28, 49, the seal being secured (e.g. moulded) to a front edge 176 of window 49 and having a channel (not shown) for sealing and sliding engagement with a rear edge 178 of the front window glass 28. The seal 174 overlaps the rear 176 of the front window glass 28 to provide a cosmetic seal and an initial water and noise barrier. A middle finger 173 of the seal 174 is deflected as the front 28 and rear 49 window glasses come together and an outer finger 175 of the seal is rotated inboard to touch the rear of the front window glass 28 outside surface at its rear trailing edge.

Figure 11:
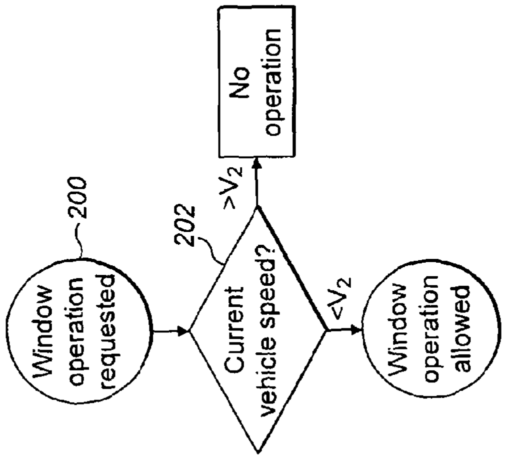
FIG. 11 shows a control method applied for disenabling window function at high speed.

FIG. 11 shows a control method applied by software and/or memory in the controller 38 which is operable at least while vehicle mode sensor 88 senses that the vehicle 10 is in use. Here, a window operation request signal 200 may be sent from one of the operation switches 34, 54 via signal path 36, 56 to the controller 38. The controller 38 is arranged then to check vehicle speed sensed by speed sensor 80 and to calculate at calculation step 202 whether the current vehicle speed exceeds a defined vehicle speed $V_2$ which may be approximately 225 to 250 kilometers an hour (140 to 150 mph) for the motor car 10. If vehicle speed is higher than the defined speed $V_2$, no window operation results since the windows are disabled, but window operation is allowed if vehicle speed is not greater than $V_2$. This functionality advantageously prevents overloading of the regulators.

Figure 13:
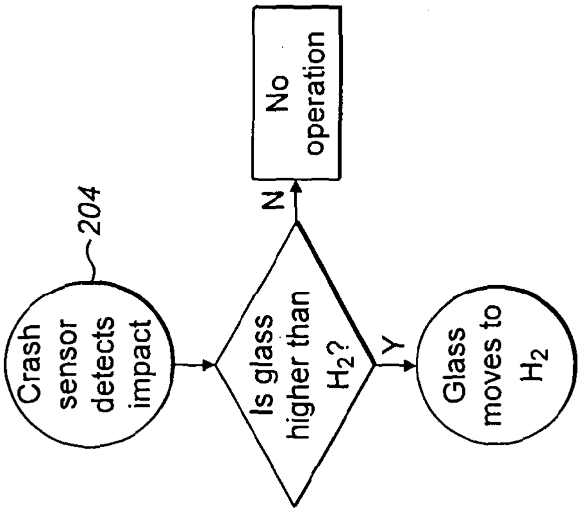
FIG. 13 shows a control method applied for lowering the vehicle glass to the "$H_2$" position upon vehicle crash.

FIG. 13 shows how a method programmed into the controller 38 allows a crash sensor detection impact 204 at the crash sensor 76 to be sent along signal path 78 to the controller 72 which is arranged to calculate for each window 28, 49 in the vehicle whether the window glass is higher than the $H_2$ position. If the glass for a window is not higher than the $H_2$ position no operation may occur for that window but if the glass is higher than the $H_2$ position (the position being as reported to the controller 38 by the regulator 30, 50 as applies) the controller controls the glass to move to the $H_2$ position. When the vehicle is involved in a crash of sufficient force to trigger the crash sensor the controller may move all of the door glass to position $H_2$ and the glass may only move if higher than $H_2$. This may allow the glass to be sealed, which may be useful for crashes in to water, but may also still allow relatively easy access into the vehicle by rescue services, for example by levering between the window top edge 146 and cant rail 102 and/or fairly easy door opening. It may also help the occupant(s) to evacuate the vehicle.

Figure 10:
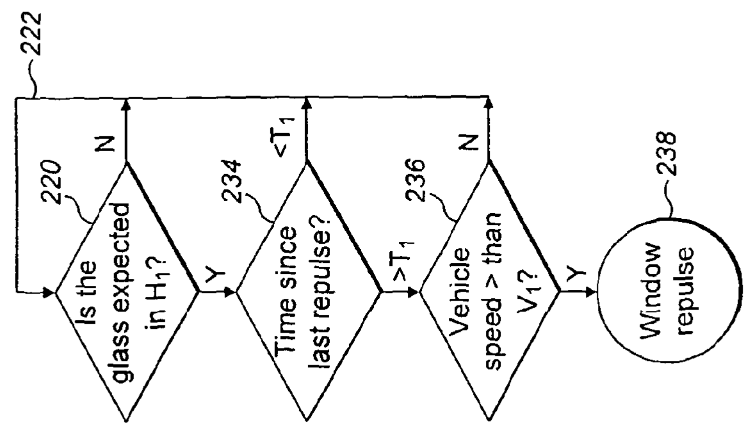
FIG. 10 shows a control method applied for re-pulsing the window glass to the "$H_1$" position.

FIG. 10 shows a method applied in the controller 38 for re-pulsing windows to remove backlash and correct for relaxation of drive cables in the regulator at a specific speed or time. This logic is used in the programmable controller 38 to re-set the window back to the $H_1$ position after a certain lapse time above defined vehicle speed $V_1$ when it is expected to be in the $H_1$ position based on position measured in the regulator and/or in the controller in response to the regulator. This function is only performed when the vehicle is in operation when the engine is running and the vehicle has been moving. All windows 28, 49 and those on the other side of the car are re-pulsed at the same time and the regulators 30, 50 stall out on their top stops (not shown) for a set period of time. This re-pulse ensures that the regulators 30, 50 have a good actual estimation of where the top edges 146 of the windows 28, 49 are at any given time to take account of backlash and relaxation and correct for them. As shown in FIG. 10 the controller 38 calculates at point 220 based on information provided to it from the regulators 30, 50 whether the window glass is expected to be in the fully up $H_1$ position. If no the logic loops round loop 222, but if yes the controller 38 calculates at point 234 whether the time since the last re-pulse exceeds a predetermined time $T_1$ which may be several minutes, hours or days, about 15 to 30 minutes being used in some embodiments, about 30 minutes being one example. If no, the logic cycles background loop 222, but if yes the controller 38 calculates at point 236 whether vehicle speed is more than the speed $V_1$. This speed may be the same as or different to a drive-away door lock speed of the vehicle (and/or the speed at which windows are raised to the $H_1$ position) or could differ therefrom. If no, the logic cycles back round loop 222, but if yes the windows are re-pulsed at point 238 to the $H_1$ position.

Once the vehicle has stopped as indicated to the controller by speed sensor 80 or by hand brake and/or park gear selection sensors (not shown) or below a pre-set speed the programmable controller 38 may apply the method of FIG. 8 to apply a short drop triggered by any of the sensors 44, 46, 64, 66. Such sensors may cause the controller 38 to recognise at point 230 that an interior or an exterior handle is being pulled and the controller 38 may then sense at point 232 whether the vehicle is locked using a signal from vehicle power mode sensor 88 or another sensor. If yes, there is no window operation, but if no at point 234 the controller 38 may calculate based on signals received from door latch sensors 40, 60 whether the door associated with the handle which has been pulled is fully latched. If no, there is no window operation, but if yes the controller 38 then calculates at point 236, based upon window positions reported by regulators 30, 50 as appropriate, whether the glass is at or above the $H_3$ position. If no, there is no window operation, but if yes the window glass is short-dropped to the $H_3$ position enabling opening of the relevant door 20, 24. The sensor 64 for the interior door handle has function mirroring the external handle sensor 66 function. This short-drop only performs when the door is latched and the glass is at or above the short-drop position $H_3$. When the door is in an unlatched state the glass never travels above the short-drop position $H_3$ in any vehicle mode. The short-drop procedure of FIG. 8 can be performed in all power modes, including transport mode and minimum operating voltage mode of the vehicle as indicated to the controller 88 by the vehicle power mode sensor 88. When the door is latched shut, the window returns the $H_2$ position from the $H_3$ position.

Figure 8:
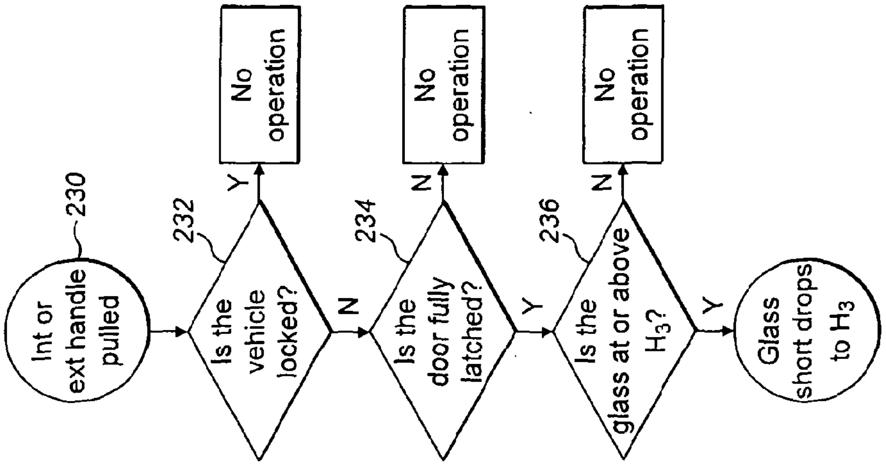
FIG. 8 shows an example of control method applied for lowering the window glass to the "$H_3$" position.
Figure 9:
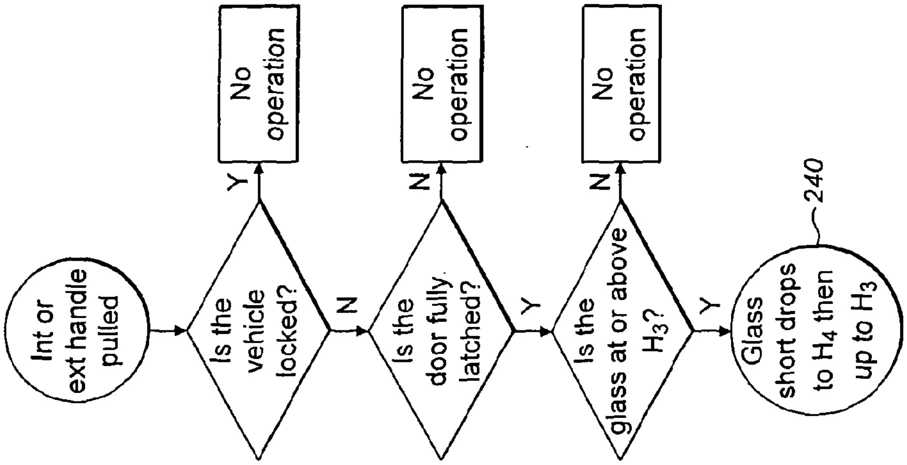
FIG. 9 shows a control method applied for lowering the vehicle glass to the "$H_3$" position via the "$H_4$" position.

FIG. 9 shows a short-drop logic applied in a very similar way to that in FIG. 8 but including a useful feature for reducing backlash. The logic method in FIG. 9 is the same as that in FIG. 8 apart from that at the last step 240 the glass lowers past the short drop position of $H_3$ to the $H_4$ position where it halts, the controller counts and then controls a re-spool back up the short-drop position $H_3$. This can occur for every short-drop operation for the front and rear door glasses or it may occur in other embodiments for example every 5 or 10 short-drops with the method shown in FIG. 8 otherwise being used when an interior or exterior handle is pulled.

Figure 14:
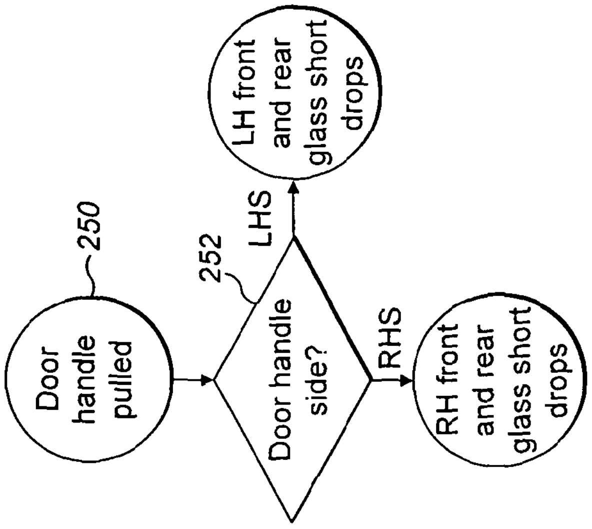
FIG. 14 shows a control method applied for dropping window glass of front and rear windows in sequence.

FIG. 14 shows a logic control method applied by the controller 38 for dropping vehicle glass in sequence. Here, when any door handle is pulled at point 250, the controller calculates at point 252 based on which side the door handle sensor signal arrives at it from whether a left hand side (not shown) or right hand side 46, 66, 44, 64 door handle has been pulled. If left hand side, the left hand front and rear glass is short-dropped to the $H_3$ position, either directly or via the $H_4$ position if a re-spool is used as discussed with reference to FIG. 9. If a right hand side, the controller 38 controls the right hand front 28 and rear 49 glass to short-drop to the $H_3$ position either directly or via the $H_4$ position. In some embodiments the glass can always drop to the $H_3$ position via the $H_4$ position and may occur every short-drop operation.

Figure 3A:
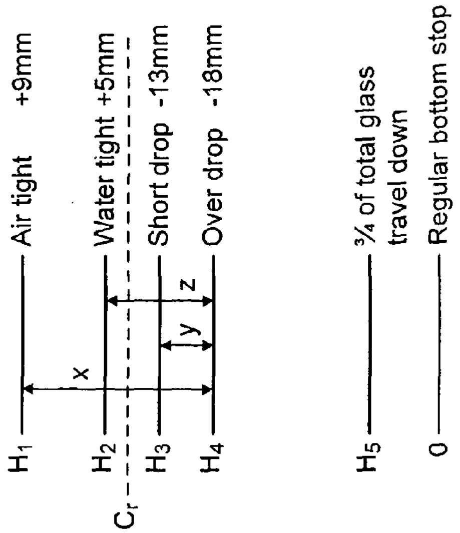
FIG. 3A shows a further view of window positions including a rear window "$H_5$" position.

Furthermore, according to an easy open logic control method applied by the controller 38, when the exterior or interior handle 66, 64 of either rear door 24 is pulled, as sensed by the associated sensor, the rear glass on that side of the motor car 10 is lowered by the regulator 50 to the $H_5$ position shown in FIG. 3A in which the top edge 146 of the window is three quarters of the total glass travel down from the $H_1$ position to the regulator bottom stop position. No re-spool feature is used when the rear door handles are pulled in this way. The movement of the rear glass to the $H_5$ position enables easy passenger access to and from the rear seat 96 with good body spacing of the passenger from the top edge 146 of the glass 49 which may in the case of some motor cars 10 be substantially inwardly slanted from bottom to top. There is no re-spool feature when the rear door handles are pulled this way. When the front door handles are then pulled with the rear window in the $H_5$ position, the front glass either dropped directly to the $H_3$ position or via the $H_4$ re-spool position. Once the rear door is closed the rear door glass returns to the $H_2$ position.

Figure 15:
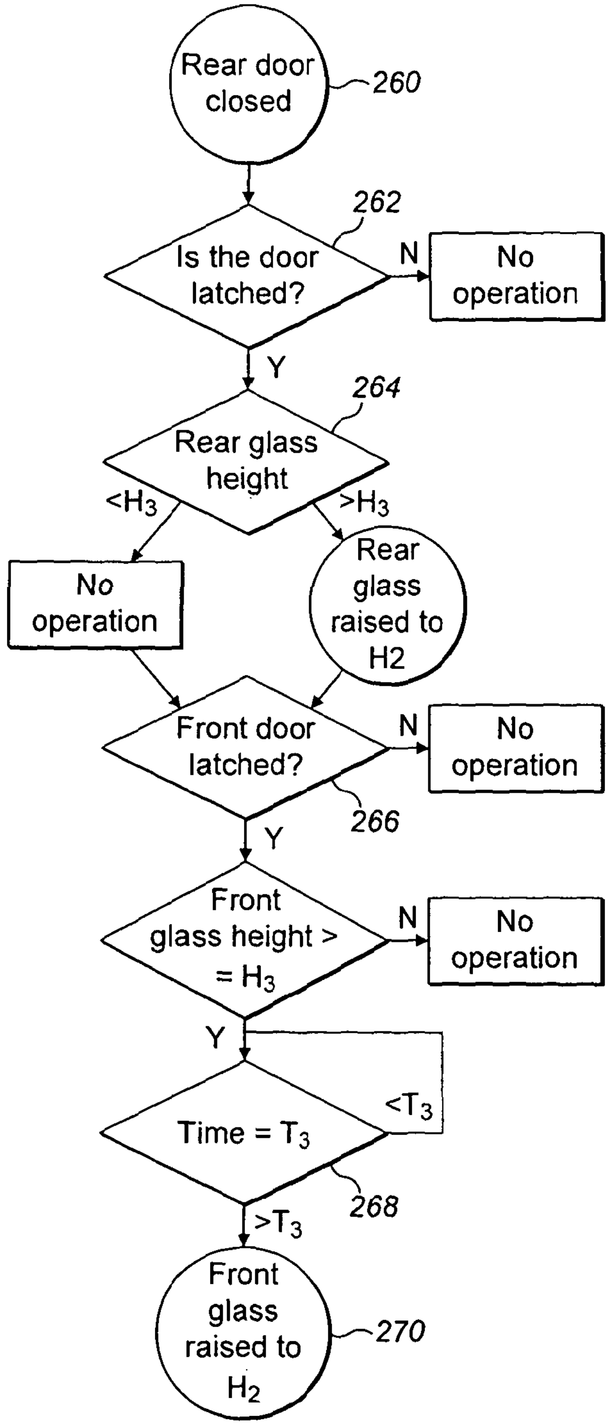
FIG. 15 shows a control method applied for returning a rear door glass to the "$H_2$" position followed by an associated front door glass.
Figure 18:
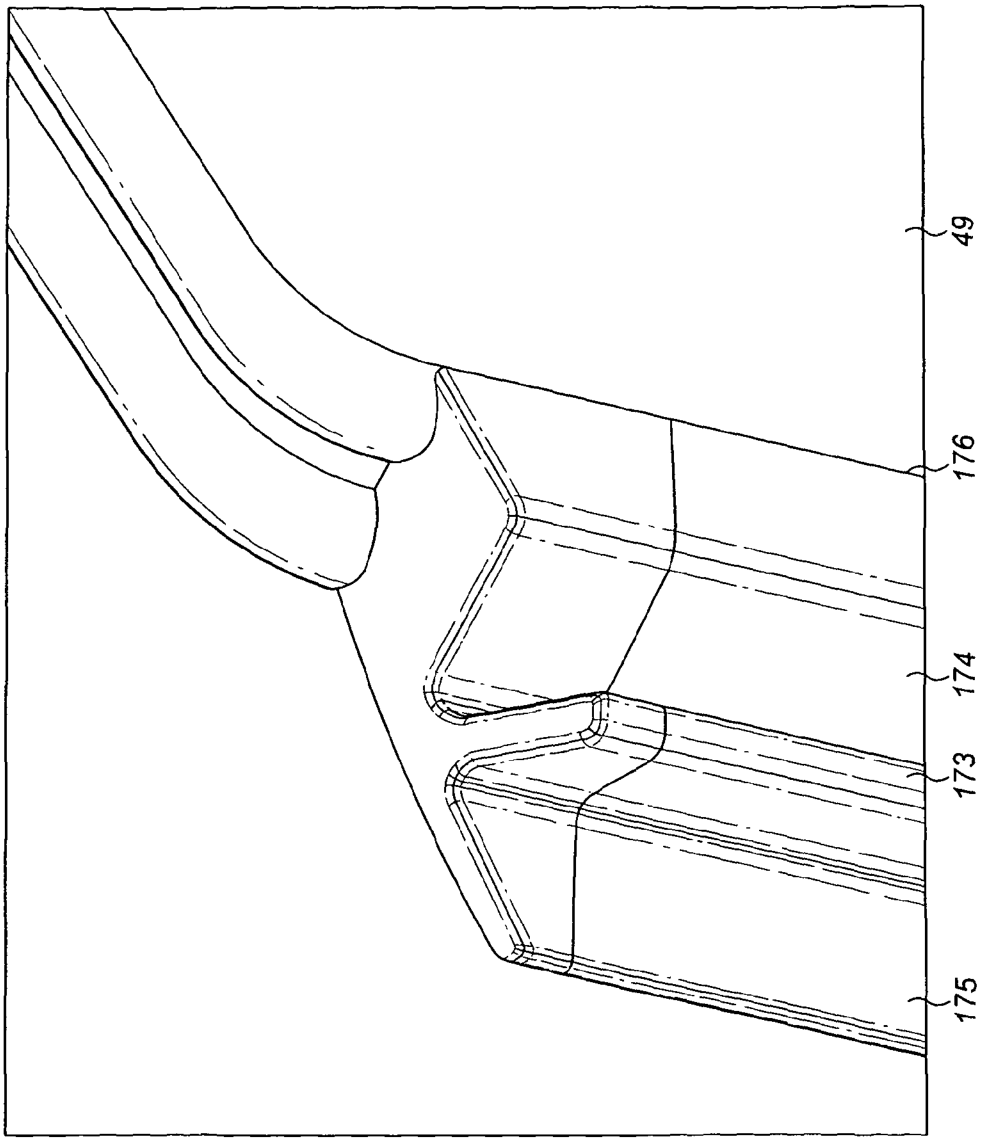

FIG. 15 shows a logic control method applied in the controller 38 for returning the rear glass first to the $H_2$ position followed by the front glass. When the rear door 24 is closed at point 260, the controller 38 calculates at point 262 whether this door is latched. If no, there is no window operation, but if yes the controller 38 calculates at point 264 whether the rear glass height is higher or lower than the $H_3$ position (one side of the calculation may have an "equal to $H_3$" included too). If lower, there is no rear glass regulator operation, but if higher, the regulator 50 is instructed by the controller 38 to raise the rear glass to the $H_2$ position. After this at point 266, the controller 38 calculates based on signals from the latch 40 whether the front door is latched. If no, there is no front window 28 operation, but if yes, the front glass 28 height is checked by the controller 38 to see whether it is equal to or higher than the $H_3$ position. If no, there is no front glass 28 operation but if yes, the controller 38 waits for a delay of time of $T_3$ second, which may for example be from about 0.2 to 0.5 seconds to 1 second at point 268 before raising the front glass at point 270 to the $H_2$ position. Therefore in this method and as shown in FIG. 3B the rear door glass will return to the $H_2$ position first, followed by the front door glass after a delay of $T_3$ seconds. This is applicable for both sides of the car and in this embodiment is applicable for all short-drop operations. This enables the rear glass 49 and seal 174 to help create a frame for the front window glass 28, which may be less well supported in some cases than the rear glass. In other embodiments, the front glass may raise first, followed by the rear glass.

The various control logic methods described above may be overridden manually by the use of the window switches 34, 54 and, in particular, the computer controller 38 may not run the method of FIG. 15 or any other method which automatically results in a closing movement of any window if that window has been user operably lowered using one of the switches 34, 54.

Figure 12:
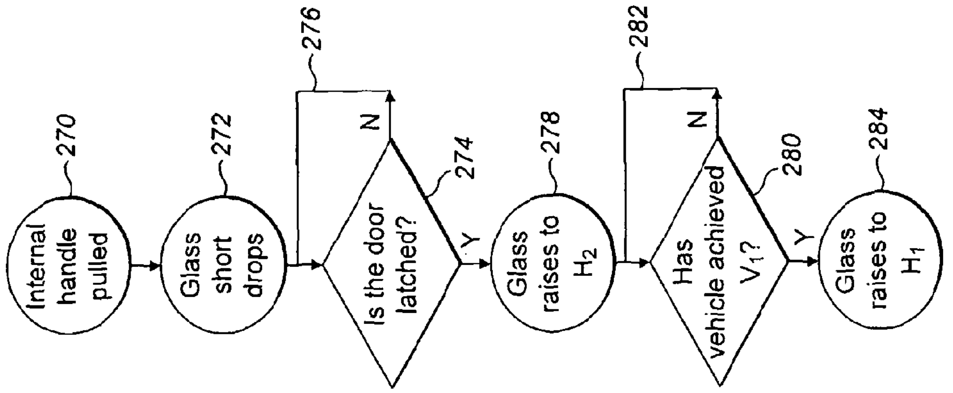
FIG. 12 shows a control method applied for raising the window glass to the "$H_2$" position when a door is opened and then closed.

FIG. 12 shows a control method applied by the controller 38 for ensuring that when a door is opened and then closed the glass only returns to the $H_2$ position.

In this method when an internal handle is pulled as sensed by internal handle switches 44, 64 at point 270, the glass on that window or on that side of the vehicle is short-dropped in accordance with the method of FIG. 8, the method of FIG. 9 and/or the method of FIG. 14 at point 272. The controller 38 then checks whether the door concerned is latched or closed again as sensed by the appropriate latch/close sensor 40, 60 at point 274. If no, the controller 38 loops around loop 276 to check again whether the door is latched, but if yes, the glass or glasses, 28, 49 are raised at point 278 to the $H_2$ position. Thereafter at point 280, the controller 38 checks based on the signal received from the speed sensor 80 whether the vehicle 10 has achieved $V_1$, namely the drive away door lock speed of approximately 5 to 10 kilometers an hour. If no, the controller loops around loop 282 and checks again whether speed $V_1$ has been achieved, but if yes the controller 38 issues an instruction to the relevant regulator or regulators 30, 50 at point 284 to raise the glass or glasses 28, 49 to the $H_1$ position.

In the $H_1$ position the glass has a 9 mm insertion into the seal. This can make it hard to open the door when in a total power failure situation. This is alleviated by the method placing the window in the $H_2$ position at any time when the vehicle is parked with nobody in it and doors closed, such that if ever there should be a power failure situation the windows will be in the $H_2$ position. The method ensures that when the door is opened with an interior handle and closed again the glass only returns to $H_2$ until the vehicle speed is greater than $V_1$ which can be the auto door lock speed. With the glass at position $H_2$, it is quick and easy to exit the vehicle since the glass does not need to travel all of the way down from the $H_1$ position to clear the exterior seal.

The controller 38 is also arranged to perform a global close function when lock button 300 on key fob 302 is pressed and held for longer than a certain period of time such as three seconds. When this happens and this is sensed by sensor 84 which sends a global close function signal via sensor 86 to controller 38, the controller ensures that regulators 50, 30 raise all vehicle window glasses 28, 49 to the $H_2$ position and, if fitted, a panoramic roof blind 72 is also caused to fully close upon receipt of a control signal 74 to do the same from the controller 38. The global closed function only operates on door glass which is at the $H_3$ position or lower. All of the window glasses and the blind move at the same time to achieve secured positions as quickly as possible all round. The controller controls the rear glass to raise immediately to the $H_2$ position. The front glass 28 is immediately raised to the $H_3$ position and the controller then checks that the rear glass 49 is at the $H_2$ position and once this is confirmed this front glass is also raised to the $H_2$ position.

The controller 38 is also programmed to perform a global open function. When an unlock button 302 on the key fob is pressed and held for longer than three seconds by a user 306, the controller 38 instructs the regulators 30, 50 to lower all door glasses to their lowest position, regardless of the glass position of each window and all the door glasses 28, 49 move at the same time.

Various modifications are envisaged to the specific embodiments described above. For example, the invention may be employed in motor vehicles with only two doors and only two main raiseable and lowerable windows, instead of in a vehicle with four doors as discussed above. Such changes are considered to be within the scope of the accompanying claims as interpreted under the Patent Law.

The invention claimed is:

1. A window system for a vehicle, the system comprising:
an openable window;
a controller for controlling positions of the window, the controller being arranged for controlling the window to a first closed position when a first condition occurs and to a second closed position when a second condition occurs; and
a door handle sensor in communication with the controller and configured to provide an indication upon door handle actuation; wherein upon door handle actuation, the controller is arranged to control the window to a third position, which is an open position in which a door associated with the window may be opened; and
wherein the controller is arranged to control the window to the third position via a fourth position in which the window is further open than in the third position.

2. The window system of claim 1, wherein the window is slideable in a vehicle door and has a top edge arranged to seal with a window seal, the window having a greater insertion into the seal in the first closed position than the second closed position.

3. The window system of claim 2, wherein the seal has an outer portion extending therealong and the top edge is inserted about 5 mm into the seal past the outer portion when the window is in the second closed position.

4. The window system of claim 2, wherein the seal has an outer portion extending therealong and the top edge is inserted about 9 mm into the seal past the outer portion when the window is in the first closed position.

5. The window system of claim 1, wherein the controller is arranged to move the window to the first closed position in response to vehicle motion.

6. The window system of claim 5 further comprising a speed sensor in communication with the controller, wherein the controller is arranged to move the window to the first closed position when the speed sensor detects speed exceeding a predetermined speed.

7. The window system of claim 6, wherein the controller is arranged to disable all window movement operations when the speed sensor detects speed exceeding a speed higher than a set amount.

8. The window system of claim 1, further comprising a door latch sensor in communication with the controller, wherein the controller is configured to control the window to the second closed position in response to a signal indicating that the door latching has occurred.

9. The window system of claim 1, further comprising a vehicle crash sensor in communication with the controller, wherein if the window is higher than the second position the controller is arranged to control the window to the second closed position in response to a crash signal issued by the crash sensor.

10. The window system of claim 1, further comprising a window regulator having a motor for moving the window, the window regulator being arranged for operation in response to the controller, the controller being separate to or integral with the regulator.

11. A vehicle including a window system comprising:
a window;
a controller operably connected to the window and configured to selectively move the window; wherein
when a first condition occurs the controller moves the window to a first closed position; and
when a second condition occurs the controller moves the window to a second closed position;
a door including an operation handle for opening the door; and
a door handle sensor in communication with the controller and configured to determine movement of the operation handle; wherein upon actuation of the operation handle, the controller is configured to control the window to a first open position in which the door may be opened; and
wherein the controller is configured to control the window to the first open position via a second open position in which the window is further open than in the first open position.

12. The vehicle of claim 11, wherein a first vehicle side has a front window arranged for movement in a front door and a rear window arranged for movement in a rear door.

13. The vehicle of claim 12,
when the operation handle moves, the controller moves the front and rear windows to first open position.

14. The vehicle of claim 13, wherein when the rear door is latched closed the controller moves the rear window to the second closed position; and
when the rear window is in the second closed position, the controller moves the front window to the second closed position.

15. The vehicle of claim 14, wherein the rear window has a range of movement from fully open to fully closed and upon movement of the operation handle, the controller opens the rear window to a position ranging between one half and three quarters of a fully open position.

16. The vehicle of claim 14, wherein in response to a vehicle global close signal, the controller closes the front window and the rear window to the second closed position.

17. The vehicle of claim 16, wherein in response to a vehicle global open signal the controller opens the front and rear windows to a fully open position.

18. The vehicle of claim 11, wherein the window is part of a frameless window assembly, the window having a free upper edge which is arranged to seal against a seal secured to a body portion of the vehicle.

19. A method of controlling window position in a vehicle comprising:
moving a vehicle window to a first closed position when a first vehicle condition occurs;
moving the vehicle window to a second closed position when a second vehicle condition occurs;
moving the vehicle window to a third position, which is an open position in which a door associated with the vehicle window may be opened, upon actuation of a door handle; and
prior to moving the vehicle window to the third position, moving the vehicle window to a fourth position in which the window is further open than in the third position.

20. The method of claim 19, further comprising sliding a top edge of the window into or adjacent a seal to close the window, wherein the edge is inserted further into or overlapped more with the seal in response to the occurrence of the first condition.

21. The method of claim 19, wherein the first condition occurs upon a vehicle speed exceeding a first predetermined value.

22. The method of claim 19, wherein the second condition occurs upon closing a door to which the window is mounted.

23. A window control system for a movable vehicle window comprising a window;

a control system configured to selectively move the window between a fully open position and a fully closed position, the control system configured to control the window to a first closed position when a first condition occurs and to a second closed position when a second condition occurs; and door handle sensor in communication with the control system and configured to provide an indication upon door handle actuation; wherein upon door handle actuation, the control system is configured to control the window to a third position, which is an open position in which an associated door may be opened; and wherein the control system is configured to control the window to the third position via a fourth position in which the window is further open than in the third position.

24. The window control system of claim 23, wherein the window is slideable in a vehicle door and has a top edge arranged to seal with a window seal, the window having a greater insertion into the seal in the first closed position than the second closed position.

25. The window control system of claim 24, wherein the seal has an outer portion extending therealong and the top edge is inserted about 5 mm into the seal past the outer portion when the window is in the second closed position.

26. The window control system of claim 24, wherein the seal has an outer portion extending therealong and the top edge is inserted about 9 mm into the seal past the outer portion when the window is in the first closed position.

27. The window control system of claim 23, wherein the control system is configured to move the window to the first closed position in response to vehicle motion.

28. The window control system of claim 27 further comprising a speed sensor in communication with the control system, wherein the control system is arranged to move the window to the first closed position when the speed sensor detects speed exceeding a predetermined speed.

29. The window control system of claim 28, wherein the control system is configured to disable all window movement operations when the speed sensor detects speed exceeding a speed higher than a set amount.

30. The window control system of claim 23, further comprising a door latch sensor in communication with the control system, wherein the control system is configured to control the window to the second closed position in response to a signal indicating that door latching has occurred.

31. The window control system of claim 23, further comprising a vehicle crash sensor in communication with the control system, wherein the control system is configured to control the window to the second closed position in response to a crash signal issued by the crash sensor when the window is higher than the second closed position.

32. The window control system of claim 23, further comprising a window regulator having a motor for moving the window, the window regulator configured for operation in response to the control system, the control system separate to or integral with the regulator.

* * * * *